Dec. 31, 1940.    H. W. HEYMAN    2,226,610
STRAIN RELIEF FOR ELECTRICAL APPLIANCE CORD SETS
Filed March 8, 1940
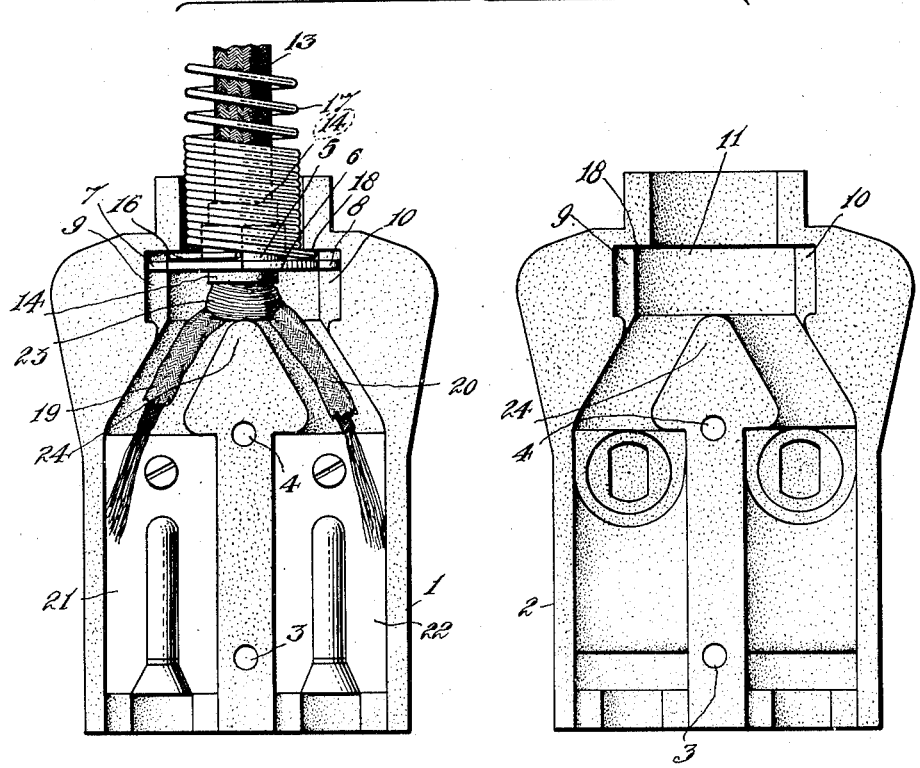
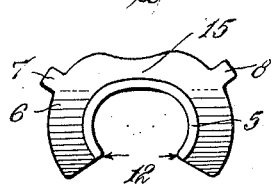
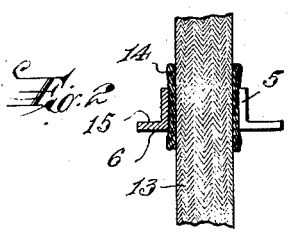
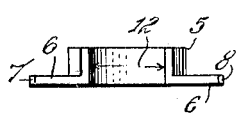
INVENTOR
Horace W. Heyman
BY
ATTORNEY Patented Dec. 31, 1940

2,226,610

UNITED STATES PATENT OFFICE 2,226,610

STRAIN RELIEF FOR ELECTRICAL APPLIANCE CORD SETS

Horace W. Heyman, Kenilworth, N. J.

Application March 8, 1940, Serial No. 322,906

5 Claims. (Cl. 173—322)

This invention relates to means for relieving the strain on an electrical cord or cable used with various electrical appliances such as flat irons and toasters.

In the construction of a plug for household electrical appliances the plug is usually made with an annular recess at one end, through which the cord passes. This annular recess is ordinarily used for the reception of a protecting spring which is used around the plug end of the cord. After passing through this annular recess, the conductors of the cord are split and pass on opposite sides around what may be termed a divider, to their respective contact terminals positioned in recesses formed in the two halves of the plug.

In certain of these appliances, if used for a considerable length of time, as in the case of a flat iron, the plug may become quite hot and the operator, in pulling out the plug, would take hold of the cord and give it a yank. This puts a highly detrimental strain on the conductors of the cord and tends to break the conductors or pull them loose from their terminals, with the danger of causing a short circuit, thereby introducing a fire hazard.

The Underwriters Laboratories now require that the cord of an appliance set shall be capable of withstanding for a period of about one minute a straight pull of fifty pounds between the cord and plug, with the cord conductors entirely disconnected from their respective terminals; also, the cord shall be capable of withstanding for a period of one minute a torque of three inch-pounds between the cord and the plug.

It is therefore the principal object of my invention to provide a strain-relief for the cord which will meet the above requirements with a large factor of safety.

It is a further object of my invention to provide a strain relief which may be applied to all present-day plugs having the said annular recess at the cord end.

Other and further objects will be apparent to one skilled in this particular art after reading the following specification, taken in connection with the drawing, wherein:

Figure 1 is a view on an enlarged scale of the two parts of the plug showing the cord in assembled relation with one half of the plug.

Figure 2 is a part-sectional and part-elevational view through the strain-relief device as applied to the cord, at right angle to Figures 1 or 3.

Figure 3 is a plan view on an enlarged scale of the metallic member forming the strain-relief device in its initially constructed state.

Figure 4 is a side view of Figure 3, looking toward the split side of the device.

As shown in the various views, 1 and 2 illustrate the two halves of a plug which is moulded from any suitable material, the two halves preferably being identical so that when put together and held in any satisfactory manner, as by screws which may be passed through the holes 3 and 4, the cord is held in working relation with the two parts of the plug.

My improved form of strain-relief device comprises a metallic member, which has considerable stiffness, having a collar portion 5 and an integral flange portion 6. The flange 6 is preferably provided with a plurality of lugs 7 and 8 which are adapted to be positioned in oppositely disposed pockets formed by recesses 9 and 10 in each of the plug halves 1 and 2, the depth of the pockets being just sufficient to accommodate the width of the lugs 7 and 8. This prevents the strain-relief device member from turning in the annular recess 11 formed in the two parts of the plug. The strain-relief member is initially formed with the collar and flange portions 5 and 6 split, with an opening 12 such as to accommodate the usual braided rubber-covered cord 13.

Preferably, I use, as a reenforcing member between the outer braid of the cord 13 and the inner surface of the collar 5, a strip of insulating material 14 such as a piece of asbestos tape as shown in Figure 2. After the strain-relief device and the tape 14 have been assembled to the cord in their proper position near the extremities of the conductor ends, a suitable tool is applied to the strain-relief device to close the opening 12 around the outer periphery of the cord 13, thereby very firmly gripping the same, especially when a reenforcing member, such as 14, is used.

To assist in crimping or swedging the strain-relief device around the cord 13, I prefer to reduce the width of the metal of the flange 6 at the point 15. The flange 6, when crimped or swedged around the cord 13 is of a diameter which will allow it to be readily placed within the recess 11, and beside acting as a support in the recess 11 for the cord, the flange 6 also acts as a seat for the inner turn 16 of a protecting spring 17, it being understood that the last one or two inner turns of the spring 17 are of a greater diameter than the other convolutions of the spring, and nearly equal to the diameter of the recess 11, so that the spring 17 is securely held in the recess 11 behind the annular shoulder 18 formed by the plug when the two parts are in assembled position.

In Figure 1 I have shown the two conductors 19 and 20 of the cord as disconnected from their respective terminals 21 and 22, as this illustrates the condition of the cord when ready for the strain and torque tests. If desired, the cord, where the two conductors 19 and 20 separate, may be covered with a binding thread or tape 23 adjacent the end of the divider 24, to prevent the outer braid of the cord from fraying.

In place of a separate reenforcing member 14, which is preferably of insulating material, I may apply to the outer cord of the cable a suitable varnish-like material to strengthen the fibers of the cord braiding at this point and thereby assure a better grip on the cord by the strain-relief device. Since the strain-relief device per se can be punched and formed from sheet metal, such as a suitable grade of steel, and treated with a rust-proof material, it can be made very cheaply, thereby adding little to the expense of the cord set.

What I claim is:

1. In the combination of an appliance cord and plug having interiorly disposed contacts and an annular type recess at the cord end of the plug, strain-relief means for the cord comprising a single-piece metallic member of relatively stiff material having a collar portion to inherently fit tightly around the cord when forced into gripping position around the cord and an integral flange portion to fit in said recess, the collar and flange being of the same angular length by being split at the same place, and the split being initially wide enough to allow the said member to be passed over the cord.

2. The combination with a cord set comprising a cord and plug, the latter having at the cord end an annular type recess, of strain-relief means located within the recess, said means including at least one pocket in the wall of said annular type recess and a single-piece metallic member having inherently good gripping qualities, said member having a collar portion to fit tightly around the cord when assembled thereto, and a flange portion extending integrally with and substantially all the way around the collar to fit in said recess, the collar and flange being co-incidentally split so as to pass the said member over the cord, the flange having a lug positioned in the pocket for preventing the said metallic member from turning in the recess.

3. The combination with a cord set comprising a cord and plug, the latter having at the cord end an annular type recess, of strain-relief means located within the recess, said means including arcuately spaced pockets in the wall of said recess and a single-piece metallic member having co-incidental, split collar and flange portions, the latter extending coaxially with the collar and substantially the full angular length thereof, the flange having lugs to fit in said pockets to prevent said metallic member from turning, the collar with its flange being of relatively stiff material so when the said metallic member is placed over the cord by way of the split, and the split ends forced toward each other, the member will, of itself only, grip the cord.

4. The combination with a cord set comprising a cord and plug, the latter having at the cord end an annular type recess, of strain-relief means located within the recess, said means including at least one pocket in the wall of said annular type recess, a single-piece metallic member having co-incidental, split collar and flange portions and a reinforcing means between the metallic member and the cord, the flange of said metallic member extending around the collar and having a lug to fit in said pocket to prevent turning of the metallic member in the pocket and also having a part midway between the two split ends somewhat reduced in width to assist in swaging the metallic member around the cord and reinforcing means, the said metallic member being inherently capable alone of tightly gripping the cord and the reinforcing means when the said metallic member is placed over the cord and reinforcing means by way of the split, and the split ends forced toward each other.

5. The combination with an appliance cord and plug, having interiorly disposed contacts and an annular type recess at the cord end of the plug, and a protecting spring member having one end normally positioned in the recess, of strain-relief means for the cord set comprising a single-piece metallic member of a material having inherent gripping properties and having an integral, co-incidental split collar and flange portions of substantially the same angular length, together with a separate reinforcement strip to fit between said metallic member and the outer covering of the cord, the split initially being wide enough to allow assembly of the said metallic member over the reinforcement strip and the cord, the flange having means cooperative with means located on the plug for preventing turning of the member in the plug, the flange also acting as a seat for the end of the protecting spring, the collar with its flange being adapted to be closed in to securely grip, by itself alone, the cord substantially as described.

HORACE W. HEYMAN.